US005933502A

United States Patent [19]

Aucsmith et al.

[11] Patent Number: 5,933,502

[45] Date of Patent: Aug. 3, 1999

[54] METHOD AND APPARATUS FOR ENHANCING THE INTEGRITY OF VISUAL AUTHENTICATION

[75] Inventors: David Wayne Aucsmith, Portland; Raymond J. Werner, Beaverton, both of Oreg.

[73] Assignee: Intel Corporation, Santa Clara, Calif.

[21] Appl. No.: 08/770,668

[22] Filed: Dec. 20, 1996

[51] Int. Cl.[6] .......... G06K 9/36

[52] U.S. Cl. .......... 380/23; 395/186; 382/117; 250/330

[58] Field of Search .......... 380/23; 395/186; 382/117, 118; 250/330

[56] References Cited

U.S. PATENT DOCUMENTS 4,109,237 8/1978 Hill .......... 340/146.3
4,642,526 2/1987 Hopkins .......... 315/244
5,031,228 7/1991 Lu .......... 382/38
5,432,864 7/1995 Lu et al. .......... 382/118

FOREIGN PATENT DOCUMENTS 9723383 5/1998 WIPO .

*Primary Examiner*—Gilberto Barron, Jr.
*Attorney, Agent, or Firm*—Ray J. Werner

[57] ABSTRACT

A method and apparatus in accordance with the present invention, in response to a request for access to a secure resource, modulates an illumination light source, such as a computer display, in a pseudo-random sequence to produce time-varying light emissions that reflect off of the object being imaged by an image recognition system. The authentication system controls both the generation of the modulated light emissions and the detection of their reflection from the object, in real time. This prevents an adversary from spoofing a visual authentication system by replaying recorded images. In further aspects of the present invention, combinations of visible and infrared illuminations may be used.

28 Claims, 3 Drawing Sheets

METHOD AND APPARATUS FOR ENHANCING THE INTEGRITY OF VISUAL AUTHENTICATION

BACKGROUND OF THE INVENTION

1. Field of the Invention

The invention relates generally to computer security and image processing systems and more particularly to increasing the resistance of visual authentication systems to replay attacks and spoofing.

2. Background

Computer systems and computer networks have been playing an ever increasing role in modern life. Computer systems and networks contain or provide access to large amounts of secure information and restricted-access resources. In order to safeguard information and resources, computer security techniques such as password protection have been widely adopted. Unfortunately, as the value of computer information and resources has increased, computer security techniques have come under attack.

In addition to password protection, a way to prevent unauthorized users from gaining access to a computer system, or a secure resource within or under control of the computer system, is to sense the physical appearance of a user (i.e., to image the user's physical appearance) and compare the image data with a set of image data corresponding to the various authorized users of the computer system. If there is a match, then the user is granted access, otherwise access to the computer system, or the secure resource, is denied.

There have been several authentication techniques proposed for the personal computer (PC) that make use of the video system of a PC. These techniques use the video camera of a PC to provide input to, for example, face or iris recognition processes. These systems have an inherent weakness that is derived from the open access to the camera, connection cables, and video capture input terminal(s). It is relatively easy for an adversary to unplug the camera and plug a video player into the video capture input terminal(s) of a PC. This allows the adversary to replay an authenticated image to the image recognition algorithm.

What is needed is a method and apparatus for making visual authentication less susceptible to replay attacks and spoofing.

SUMMARY OF THE INVENTION

A method in accordance with the present invention modulates an illumination source to produce emissions which illuminate an object. The object is imaged concurrently with the modulation of the illumination source to produce a video stream. The video stream is analyzed to determine if the video stream is affected by emissions from the illumination source.

In a further aspect of the present invention, a method modulates an illumination source, such as a PC display, in a pseudo-random sequence to produce time-varying light emissions that reflect off of an object being imaged in conjunction with a visual authentication subsystem. The visual authentication subsystem controls both the generation of the modulated light emissions and the detection of their reflection from the object, in real time. Since the modulation sequence is unknown in advance, this prevents an adversary from spoofing a visual authentication system by replaying recorded images.

In a still further aspect of the present invention, either visible or infrared portions of the electromagnetic spectrum, or both, may be modulated by the image recognition system, either singularly or in combination.

Other advantages of the present invention will be apparent from the detailed description that follows.

DETAILED DESCRIPTION

Terminology

Figure 1:
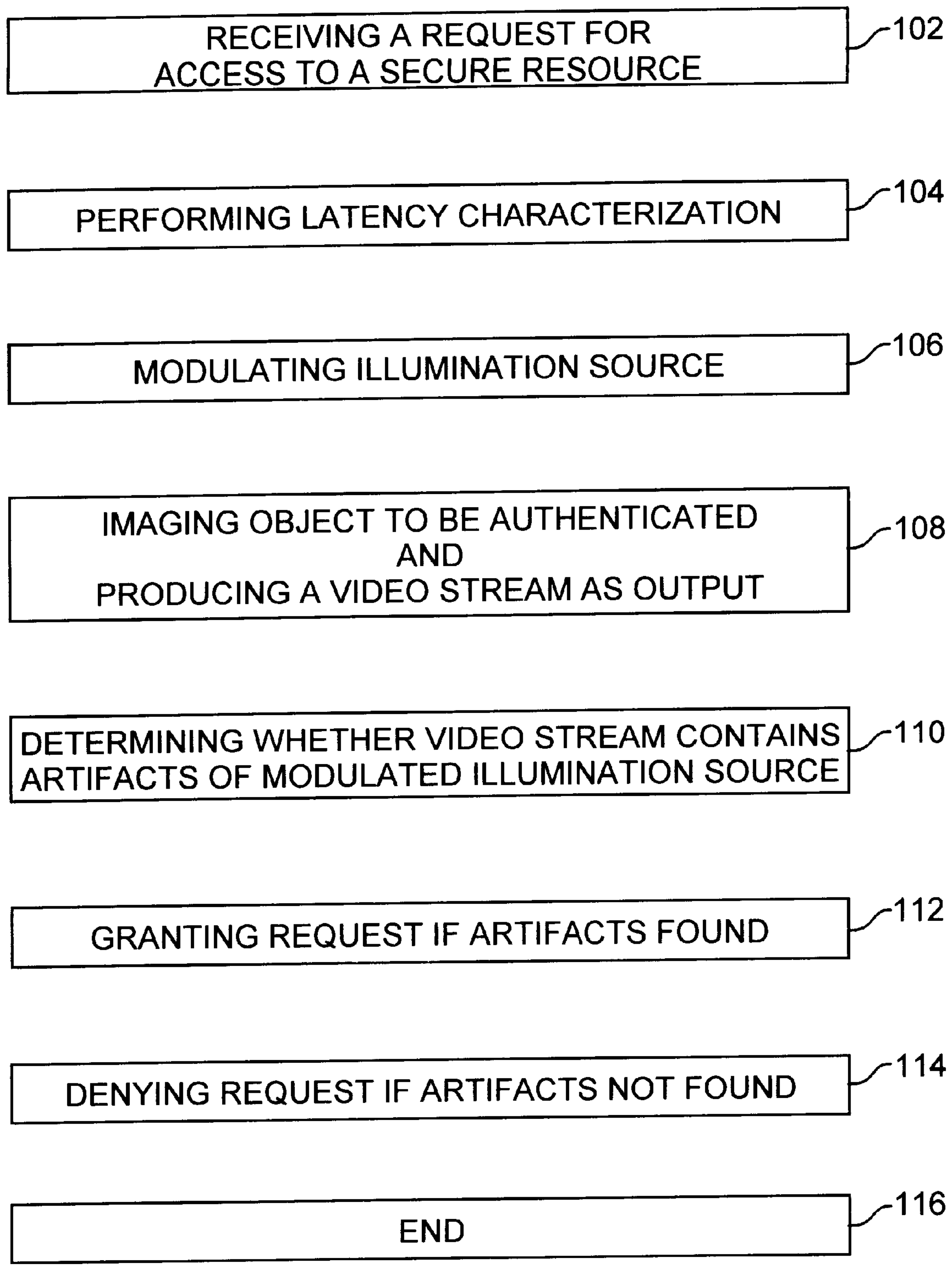
FIG. 1 is a flow chart of an embodiment of the method of authentication in accordance with the present invention.

Where examples are provided in this Terminology section, they are meant as illustrative examples and not limitations.

Imaging refers to sensing observable characteristics of an object. Typically imaging is performed in the visible portion of the electromagnetic spectrum but is not limited to this. Ultrasound imaging and infrared imaging are examples of non-visible imaging regimes. Also, as used herein, imaging includes converting the sensed characteristics, e.g., infrared emissions, to another physical representation of the sensed characteristic, e.g., electrical signals.

Artifact, as used herein, refers to information in the video stream that is a result of the modulation of an illumination source in accordance with the present invention. For example, if the illumination source is modulated so as to increase or decrease the brightness of an object being imaged, then the imaging system generates a video stream that contains information on the brightness changes, correlated in time to the modulation of the illumination source.

Secure resource, as used herein, refers to a data resource, a communication resource, or the like, or any combination thereof, wherein access to those resources is restricted to a set of users that prior to attempting to access the resources. Computer resources generally, may be secure or unsecure. It is generally understood in this context that secure does not mean that all possible breaches of security have been eliminated, but rather that special measures been taken to safeguard the secure resources that are not in place for other resources.

Spoofing, as used herein, refers to the act of fooling a computer or computer network so as to obtain access to a resource that would otherwise not be available.

Video stream refers to a one or more signals which represent, and from which can be reconstructed, an image of an object. Typically, these signals are in either analog or digital format. However, any signal format which is suitable for communicating a reconstructable representation of an image is contemplated to be encompassed by the expression "video stream". Video stream as used herein contemplates any image data stream produced by sensing devices, including but not limited to visible light video cameras, scanners, digital still cameras, infrared sensors, magnetic resonance imaging (MRI) sensors and the like.

Some portions of the detailed descriptions which follow are presented in terms of algorithms and symbolic representations of operations on data bits within a computer system. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is to be appreciated that throughout the description of embodiments of the present invention, discussions utilizing terms such as "processing" or "computing" or "calculating" or "determining" or "displaying" or the like, refer to the action and processes of a computer system, or similar computing device, that manipulates and transforms data represented as physical (e.g., electronic) quantities within a computer system's registers and memories into other data similarly represented as physical quantities within the computer system memories or registers or other such information storage, transmission or display devices.

Method

In an embodiment of the present invention, a user desiring to access a secure resource of a computer system is requested by the system to submit to a visual authentication procedure. In a typical embodiment, the user is positioned in front of a display device, such as a computer monitor. A visual authentication subsystem modulates the light output from the monitor in a pseudo-random fashion and looks for time-correlated artifacts of these illumination changes in the video stream generated by the computer's imaging sensor. In this way a determination can be made as to whether the user is actually present. Without this enhancement to visual authentication procedures in a PC environment, it would be possible for the visual authentication subsystem to be fooled, i.e., spoofed, by the introduction of pre-recorded image sensor output signals to the PC's video input signal terminal(s).

Referring to FIG. 1, an illustrative embodiment of the present invention is described. Typically, the visual authentication process is invoked when a user requests access to a secure resource. In a step 102 a request for access to a secure resource is received. In a step 104 the authentication subsystem performs a latency characterization. A latency characterization typically consists of modulating the light output of an illumination source while at substantially the same time receiving input (i.e., the video stream) from an imaging device having a field of view into which the illumination source puts out light energy. The imaging system may be any type of sensor operable to receive radiant energy reflected from the object to be authenticated. The authentication subsystem analyzes the video stream and measures the time delay between initiating changes in the output of the illumination source and receiving artifacts of the illumination modulations. In this way, the authentication subsystem is able to create a measurement time window during which to look for changes in the input stream. In a step 106 an illumination source is modulated. The illumination source is typically a computer monitor, but may be any source of radiated energy, the reflections of which can be detected by an imaging device. The illumination source may also be an infrared light source such as the type commonly used for wireless interfaces to the PC.

In a step 108 an object to be authenticated is imaged by an imaging system coupled to the secure resource. In a typical embodiment of the present invention, a video camera is used as an imaging system and the video camera is coupled to a computer system, where the computer system runs, or provides access to, the secure resource. The imaging system produces a video stream and communicates this video stream to an authenticator associated with the secure resource.

In a step 110 the authenticator processes the video stream and determines whether artifacts of the modulated illumination source are present in the video stream. Typically the artifacts represent changes in illumination caused by modulation of the illumination source in step 106.

In a step 112 the authenticator grants access to the secure resource if artifacts of the modulated illumination source are present in the video stream. If artifacts of the modulated illumination source are not present then, in a step 114 access to the secure resource is denied. The authentication process ends in a step 116. In one embodiment of the present invention, the end of the authentication process results in a computer system returning to the previous task it was performing or to an idle state. In an alternative embodiment, a determination that access is to be denied results in a notification message being generated. The notification message may be sent to the requestor of the secure resource, or to a security log kept by the computer system, or transmitted to a remote site, or any combination of these or similar notification destinations. The notification may be a visual, audible, electrical, or similar signal. For example, denial of a request for access to a secure resource results in a message displayed on a computer display, along with an audible alert tone. Those skilled in the art will recognize that there are many possible variations.

Figure 2:
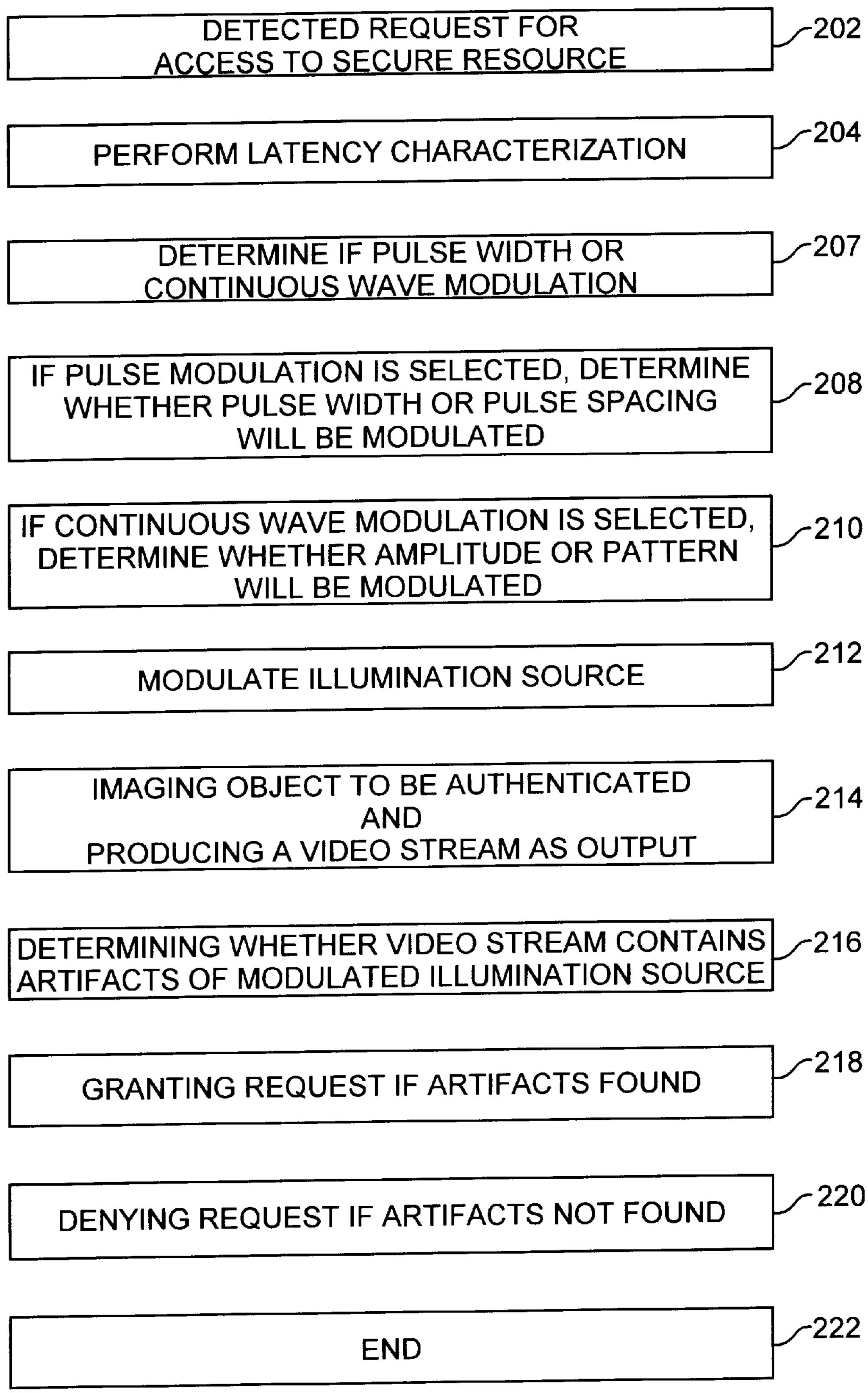
FIG. 2 is a flow chart of an embodiment of the method of authentication in accordance with the present invention.

An alternative embodiment of the present invention is described with reference to FIG. 2. In a step 202 a request for access to a secure resource is detected. In a step 204 a latency characterization, as described above, is performed. Although overall system efficiency may be improved by a latency characterization step that helps to define a time window in which to search for artifacts, it is not necessary to perform latency characterization to practice the present invention.

In a step 207 a determination is made as to the modulation scheme to be applied to the illumination source. For example, whether to apply pulse modulation or continuous wave modulation. If pulse modulation is selected, then in a step 208 a determination is made as to whether pulse width, pulse spacing (i.e., separation in time) or both will be applied as the illumination modulation scheme. However, if continuous wave modulation is selected then in a step 210 a determination is made as to whether amplitude, pattern, or both will be applied as the illumination modulation scheme. The various modulation parameters are preferably varied in a pseudorandom fashion. This increases the difficulty of a successful replay attack. The generation of pseudorandom sequences are well known to those of skill in the art.

In a step 212 an illumination source is modulated. The illumination source is typically a computer monitor, but may be any source of radiated energy, the reflections of which can be detected by an imaging device. The illumination source may also be an infrared light source such as the type commonly used for wireless interfaces to the PC. The modulation of the illumination source may be for a predetermined amount of time or may be for a pseudorandomly determined amount of time. Typically, a minimum and maximum length of time for the modulation sequence will be predetermined.

In a step 214 an object to be authenticated is imaged by an imaging system coupled to the secure resource. In a typical embodiment of the present invention, a video camera is used as an imaging system and the video camera is coupled to a computer system, where the computer system runs, or provides access to, the secure resource. The imaging system produces a video stream and communicates this video stream to an authenticator associated with the secure resource.

In a step 216 the authenticator processes the video stream and determines whether artifacts of the modulated illumination source are present in the video stream. Typically the artifacts represent changes in illumination caused by modulation of the illumination source in step 212.

In a step 218 the authenticator grants access to the secure resource if artifacts of the modulated illumination source are present in the video stream. If artifacts of the modulated illumination source are not present then, in a step 220 access to the secure resource is denied. The authentication process ends in a step 222. In one embodiment of the present invention, the end of the authentication process results in a computer system returning to the previous task it was performing or to an idle state. In an alternative embodiment, a determination that access is to be denied results in a notification message being generated. The notification message may be sent to the requestor of the secure resource, or to a security log kept by the computer system, or transmitted to a remote site, or any combination of these or similar notification destinations. The notification may be a visual, audible, electrical, or similar signal. For example, denial of a request for access to a secure resource results in a message displayed on a computer display, along with an audible alert tone. Those skilled in the art will recognize that there are many possible variations.

Apparatus

Figure 3:
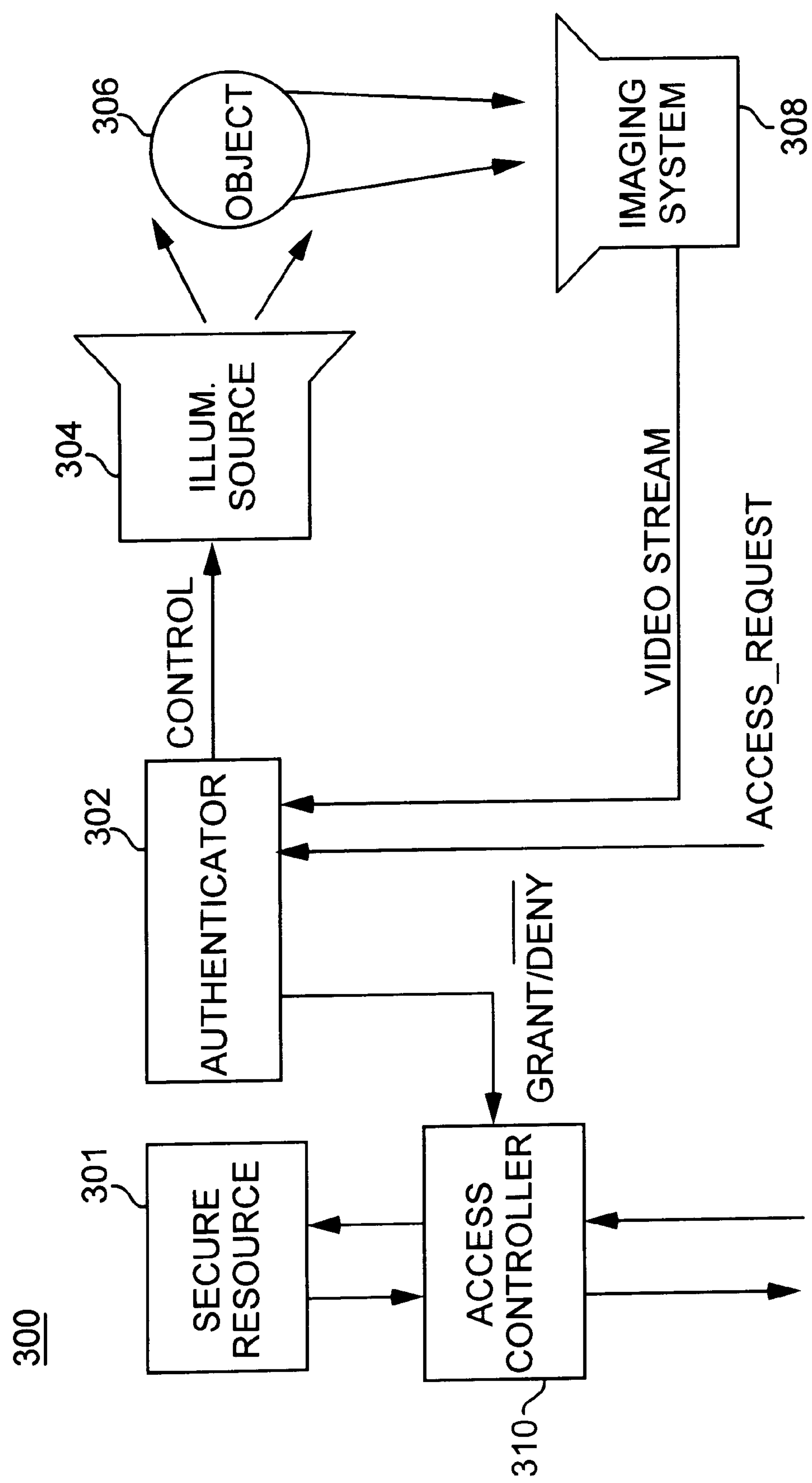
FIG. 3 is a block diagram of an illustrative embodiment of an apparatus in accordance with the present invention.

Referring to FIG. 3,an illustrative embodiment of an apparatus in accordance with the present invention is described.

In an authentication system 300, an authenticator 302 receives requests for access to a secure resource 301. Authenticator 302 is coupled to an illumination source 304, in such a way as to provide control signals for modulating the output produced by illumination source 304. An object 306 to be authenticated is typically spatially aligned with illumination source 304 such that at least a portion of radiant emissions from illumination source 304 are reflected to the position of an imaging system 308. Imaging system 308 produces a video stream and is coupled to authenticator 302 so as to communicate the video stream to authenticator 302. Authenticator 302 is further coupled to an access controller 310 so as to communicate to access controller 310 whether access to secure resource 301 should be granted in response the access request.

Illumination source 304 is typically a PC display device. Object 306 is typically a computer user requesting access to secure resource 301. More particularly, object 306 is typically the face, or an iris, of a computer user requesting access to secure resource 301. In the human eye, the iris adjusts to the ambient lighting conditions to let more or less light enter into the eye. Therefore, illuminating a human subject with visible light generally creates a measurable difference in the size of the iris as compared to the size of the pupil.

Imaging system 308 is typically a video camera. Authenticator 302 and access controller 310 are typically implemented as software executed by a PC, however, those of skill in the art will recognize that these functional blocks may also be implemented in hardware. Authenticator 302 performs the logical operations of sending modulation control information to illumination source 304, analyzing the video stream received from imaging system 308, and determining whether access to a requested secure resource should be granted.

Conclusion

The present invention provides a method for ensuring the integrity of visual authentication processes. It is particularly germane to PC environments where such systems, due to the open environment of the PC, are subject to spoofing and replay attacks.

An advantage of the present invention is that a PC equipped with a video imaging system does not require any additional hardware to implement the visual authentication system described herein.

A further advantage of the present invention is the greater level of security provided for secure resources when conventional authentication systems, such as password protection, are augmented with embodiments of the present invention.

A still further advantage of the present invention, when embodied in a portable computer, is the ability to render the portable computer unusable to anyone not previously authorized to use the portable computer.

The present invention can be embodied in the form of methods and apparatus for practicing the methods. The present invention can also be embodied in the form of computer program code embodied in tangible media, such as floppy disks, CD-ROMs, hard drives, or any other computer-readable storage medium, wherein, when the computer program code is loaded into and executed by a computer, the computer becomes an apparatus for practicing the invention. The program code, encoded in tangible media, creates the means for causing the computer to perform the various steps of the present invention. The present invention can also be embodied in the form of computer program code, whether stored in a storage medium, loaded into and/or executed by a computer, or transmitted over some transmission medium, such as over electrical wiring or cabling, through optical fibers, or via electromagnetic radiation, wherein, when the computer program code is loaded into and executed by a computer, the computer becomes an apparatus for practicing the invention. When implemented with a general-purpose microprocessor, the computer program code combines with the microprocessor to provide a unique device that operates analogously to specific logic circuits.

It will be recognized by those skilled the art many, varied, embodiments of the present invention may be implemented, for example the visual authentication process of the present invention may utilize any combination visible and infrared illuminations and those illuminations may be pulsed or continuously variable. The authentication process of the present invention may be used in conjunction with other authentication processes such as password protection and/or voice recognition. Similarly, it will be recognized that any appropriate illumination source under the control of the authentication process, not only a computer display, may be used to implement an embodiment of the present invention, for example, room lighting which is responsive in intensity and/or frequency to commands received from the authentication process.

It will be understood that many other various changes in the details, materials, and arrangements of the parts and steps which have been described and illustrated in order to explain the nature of this invention may be made by those skilled in the art without departing from the principles and scope of the invention as expressed in the subjoined Claims.

What is claimed is:

1. A method of visual authentication, the method comprising:

a) generating at least one pseudo-randomly modulated light output;

b) imaging an object during at least a portion of the pseudo-randomly modulated light output to create a video stream; and c) determining whether the video stream is affected by the light output.

2. The method of claim 1, further comprising the steps of:

prior to step (a), receiving a request for access to a secure resource;

subsequent to step (c), if the determination is that the video stream has been affected, then granting access to the requested secure resource; and if the determination is that the video stream has not been affected then denying access to the requested secure resource.

3. The method of claim 2, further comprising the step of generating a first light output.

4. The method of claim 3, further comprising the step of:

subsequent to the step of generating the first light output, determining the latency between generating the first light output and receiving in the video stream at least one artifact of the first light output.

5. The method of claim 1, wherein generating a pseudo-randomly modulated light output comprises generating a series of light pulses, the light pulses being separated by pseudo-random amounts of time.

6. The method of claim 1, wherein generating a pseudo-randomly modulated light output comprises generating a series of light pulses, the light pulses having pseudo-random amplitude.

7. A method of visual authentication, the method comprising the steps of:

a) pseudo-randomly changing a light output of a display device;

b) imaging an object during at least a portion of the pseudo-randomly changing light output to create a video stream; and c) determining whether the video stream is affected by the light output.

8. The method of claim 7, wherein pseudo-randomly changing the light output comprises:

generating one or more pseudo-random time points at which to change the light output; and maintaining that changed light output for a predetermined amount of time.

9. The method of claim 7, wherein pseudo-randomly changing the light output comprises:

generating one or more pseudo-random points in time at which to change the light output; and maintaining that changed light output for a pseudo-random amount of time.

10. The method of claim 7, further comprising the steps of:

receiving a request for access to a secure resource;

if the determination is that the video stream has been affected, then granting access to the requested secure resource; and if the determination is that the video stream has not been affected then denying access to the requested secure resource.

11. The method of claim 7, wherein the object is an object to be authenticated.

12. The method of claim 7, wherein the object is a requester of a secure resource.

13. The method of claim 7, wherein the object is a pupil of a requestor of a secure resource.

14. A method of visual authentication, the method comprising:

a) applying, for a time period, a pseudo-random time-varying light output modulation signal to a light producing device;

b) imaging an object during at least a portion of the time period; and c) determining whether a video stream representative of the object imaged in (b) is affected by the modulated light output.

15. The method of claim 14, wherein the object is a computer user who has requested access to a computer resource.

16. The method of claim 14, wherein the light producing device is a computer display device.

17. The method of claim 14, wherein the time period is predetermined.

18. The method of claim 14, wherein the modulation signal directs the light producing device to produce pulsed changes in light emissions.

19. The method of claim 14, wherein the modulation signal directs the light producing device to produce continuous changes in light emissions.

20. A method of authentication, the method comprising providing a sensor operable in the visible portion of the electromagnetic spectrum;

providing a sensor operable in the infrared visible portion of the electromagnetic spectrum;

requesting an image data input stream for an object to be authenticated;

generating a pseudo-randomly time-varying infrared light emission; and determining whether the image data input stream includes artifacts of infrared reflections correlated in time with at least a portion of the generated pseudo-randomly time-varying infrared light emission.

21. The method of claim 20, wherein generating the pseudo-randomly time-varying infrared light emission comprises generating a pseudo-random sequence of substantially fixed length infrared pulses.

22. The method of claim 20, wherein generating the pseudo-randomly time-varying infrared light emission comprises generating a sequence of infrared pulses having pseudo-randomly generated pulse widths.

23. The method of claim 20, wherein generating the pseudo-randomly time-varying infrared light emission comprises generating a pseudo-random sequence of infrared pulses having pseudo-randomly generated pulse widths.

24. The method of claim 20, wherein generating the pseudo-randomly time-varying infrared light emission comprises generating a pseudo-randomly modulated continuous wave infrared signal.

25. The method of claim 20, wherein the sensor operable in the visible portion and the sensor operable in the infrared portion of the electromagnetic spectrum are the same sensor.

26. A computer readable storage medium encoded with computer readable program code, comprising:

a) a means for causing a computer to pseudo-randomly generate a plurality of light outputs;

b) a means for causing a computer to image an object during at least a portion of the sequence of light flashes; and c) a means for causing a computer to determine whether a video stream representative of the object is affected by the light outputs.

27. An apparatus for visual authentication, comprising:

a) an authenticator;

b) an illumination source having a modulation control input coupled to a modulation control output of the authenticator; and c) an imaging system having a video stream output coupled to a video stream input of the authenticator;

wherein the illumination source comprises a computer display device.

28. The apparatus of claim 27, wherein the imaging system comprises a video camera.

* * * * *